United States Patent [19]

Boatner et al.

[11] Patent Number: 4,847,008

[45] Date of Patent: * Jul. 11, 1989

[54] LEAD IRON PHOSPHATE GLASS AS A CONTAINMENT MEDIUM FOR DISPOSAL OF HIGH-LEVEL NUCLEAR WASTE

[75] Inventors: Lynn A. Boatner; Brian C. Sales, both of Oak Ridge, Tenn.

[73] Assignee: The United States of America as represented by the Department of Energy, Washington, D.C.

[*] Notice: The portion of the term of this patent subsequent to Apr. 11, 2005 has been disclaimed.

[21] Appl. No.: 870,296

[22] Filed: May 23, 1986

Related U.S. Application Data

[63] Continuation of Ser. No. 599,111, Apr. 11, 1984, abandoned.

[51] Int. Cl.$^4$ .......................... G21F 9/16; C03C 8/10; C03C 8/08
[52] U.S. Cl. .................................... 252/629; 501/22; 501/24; 501/45
[58] Field of Search ....................... 252/628, 629, 478; 501/22, 24, 32, 45, 73, 74, 155

[56] References Cited

U.S. PATENT DOCUMENTS

| | | | |
|---|---|---|---|
| 3,120,493 | 2/1964 | Clark et al. | 252/629 |
| 3,365,578 | 1/1968 | Grover et al. | 252/629 XR |
| 4,351,749 | 9/1982 | Ropp | 252/629 XR |

OTHER PUBLICATIONS

Chem. Abst. vol. 80, 1974, 73979n, "Vitrification of Compatible Intermediate and High-Level Liquid Radioactive Wastes", Final Report, Feb. 1, 1970–Jan. 31, 1971, K. T. Thomas.

*Primary Examiner*—John F. Terapane
*Assistant Examiner*—Virginia B. Caress
*Attorney, Agent, or Firm*—Irving Barrack; Stephen D. Hamel; Judson R. Hightower

[57] ABSTRACT

Lead-iron phosphate glasses containing a high level of $Fe_2O_3$ for use as a storage medium for high-level radioactive nuclear waste. By combining lead-iron phosphate glass with various types of simulated high-level nuclear waste, a highly corrosion resistant, homogeneous, easily processed glass can be formed. For corroding solutions at 90° C., with solution pH values in the range between 5 and 9, the corrosion rate of the lead-iron phosphate nuclear waste glass is at least $10^2$ to $10^3$ times lower than the corrosion rate of a comparable borosilicate nuclear waste glass. The presence of $Fe_2O_3$ in forming the lead-iron phosphate glass is critical. Lead-iron phosphate nuclear waste glass can be prepared at temperatures as low as 800° C., since they exhibit very low melt viscosities in the 800° to 1050° C. temperature range. These waste-loaded glasses do not readily devitrify at temperatures as high as 550° C. and are not adversely affected by large doses of gamma radiation in $H_2O$ at 135° C. The lead-iron phosphate waste glasses can be prepared with minimal modification of the technology developed for processing borosilicate glass nuclear wasteforms.

3 Claims, 3 Drawing Sheets

LEAD IRON PHOSPHATE GLASS AS A CONTAINMENT MEDIUM FOR DISPOSAL OF HIGH-LEVEL NUCLEAR WASTE

This a continuation of application Ser. No. 599,111 filed Apr. 11, 1984 now abandoned.

BACKGROUND OF THE INVENTION

1. Field of the Invention and Contract Statement

The invention relates to primary containment media for the disposal of high-level radioactive nuclear waste. The United States Government has rights in this invention pursuant to Contract No. DE-W-7405-eng-26 between the U.S. Department of Energy and Union Carbide Corporation.

2. Discussion of Background and Prior Art

In the past, nuclear waste has been temporarily stored, frequently as a liquid or as a sludge in conjunction with a liquid. The art has recognized that means must be provided for permanent disposal of the waste, preferably as highly stable solids. Such solids must have certain characteristics which make such solids safe and economical for the long-term ($10^3$ to $10^5$ years) retention of radioactive waste isotopes.

Because of the long half-lives of some radionuclides (e.g., certain actinide isotopes), it is necessary that the selected storage medium exhibit certain properties in order to achieve the desired long-term stability. Some of the factors which must be considered in the selection of a storage medium include: high chemical stability, i.e., low corrosion rates; structural stability; simple to manufacture; acceptable preparation temperature; ability to store a high proportion of waste to insure minimum storage volume; and availability to components making up the storage medium.

Various glass compositions have been suggested and tested for suitability as a storage medium. The borosilicate glasses have been considered among the more promising compositions. However, the borosilicate glasses have demonstrated significant instability under hydrothermal conditions, i.e., exposure to water at temperatures greater than 100° C. Such hydrothermal conditions can be encountered in deep geological repositories.

Two highly desirable properties of any potential nuclear waste glass are a low preparation temperature and a low melt viscosity at the glass processing temperature. Pure lead phosphate glasses exhibit both of these properties [see: Argyle, J. F., and F. A. Hummel, J. Amer. Ceram. Soc. 43 (1960) 452; Osterheld, R. K. and R. P. Langguth, J. Amer. Chem. Soc. 59 (1955) 76; Ray, N. H., Glass Tech. 16 (1975) 107; Klonkowski, A., Phys. and Chem. Glasses 22 (1981) 163; and Furdanowicz, H. and L. C. Klein, Glass Tech. 24 (1983) 198]. Unfortunately, it is well known that these substances are susceptable to aqueous corrosion and that they tend to devitrify at temperatures as low as 300° C. [see: Furdanowicz, H., et al., ibid.; Ray, N. H., C.J. Lewis, J.N.C. Laycock and W.D. Robinson, Glass Tech. 14 (1973) 50; and Longman, G.W., and G. D. Wignall, J. Mat. Sci. 8 (1973) 212].

*Scientific Basis for Nuclear Waste Management*, Vol. 1, Edited by G. J. McCarthy, Plenum Press (1979), pp. 43–50, 69 to 81 and 195 to 200. The phosphate glasses described in the reference include sodium aluminum phosphate glasses, or very complicated combinations of metal oxides and $P_2O_5$. Of those phosphate glasses in the reference, only p. 74, Table 2, shows a composition containing lead oxide along with phosphorus pentoxide and nuclear waste oxides. The ratio of the phosphorus to lead content is very high and the phosphate glasses discussed therein are a multicomponent mixture of up to eight oxides.

In addition, the composition ranges given for each oxide in the reference on page 74 covers such a broad spectrum of possible phosphate glasses that the table has no significance due to the lack of specificity resulting from an effectively infinite array of permutations and combinations of glass constituents and concentrations.

See also: *Scientific Basis for Nuclear Waste Management*, Vol. 2, Edited by C. J. M. Northrup, Jr., Plenum Press (1980), p. 109 to 116; Report BNL-50130, Development of the Phosphate Glass Process for Ultimate Disposal of High-Level Radioactive Waste, R. F. Drager, et al., January 1968; and *Symposium on Management of Radioactive Wastes from Fuel Reprocessing*, Nov. 27 to Dec. 1, 1972, pp. 593–612.

No non-patent reference was found that indicated that lead-iron phosphate glasses have ever been seriously considered as a viable potential storage medium for the immobilization of nuclear wastes.

The glass and ceramic fields include the following domestic patents.

U.S. Pat. No. 3,365,578 (Grover et al.) discloses placing radioactive waste in a Na-Pb-Fe-phosphate/silicate glass, within a steel vessel. (Other Na-Pb-phosphate systems are disclosed in the examples of Grover et al.) To recap, Grover et al. teaches the use of a glass containing both Pb and phosphate for nuclear waste containment.

U.S. Pat. No. 4,314,909 (Beall et al.) teaches glass-ceramic which is used for waste storage and which consists of monazite, pollucite and $ZrO_2$ and/or mullite. The glass-ceramic can contain up to 20 percent of $P_2O_5$. Beall et al. does not mention the presence of Pb.

U.S. Pat. No. 4,351,749 (Ropp I) teaches nuclear waste storage blocks which include a polymeric phosphate glass from a trivalent metal selected from Al, In or Ga.

U.S. Pat. No. 4,382,974 (Yannopoulos) discloses a glass containing nuclear waste which is stabilized by the application of synthetic monazite by means of chemical vapor deposition or detonation gun. The monazite contains 27 to 35 weight percent of $P_2O_5$. No Pb is mentioned in Yannopoulos.

U.S. Pat. No. 3,161,600 (Barton I) and U.S. Pat. No. 3,161,601 (Barton II), respectively, show Sr and Cs sequestrated in phosphate glasses.

U.S. Pat. No. 3,120,493 (Clark et al.) teaches a process wherein ruthenium volatilization is suppressed during the evaporation and calcination of nuclear waste solutions by the addition of phosphite or hypophosphite. A glass-like solid is obtained.

U.S. Pat. No. 4,049,779 (Ropp II) teaches stable phosphate glasses of formula $M(H_2PO_4)n$, wherein M may be Pb and n is 2 or 3 (for divalent or trivalent M), which are prepared via $H_3PO_4$ and a metal compound by adding a precipitant, crystallizing from solution and then melting the material. While Ropp II discloses lead phosphate glasses, it is not directed to nuclear waste disposal, although it does not mention stability to leaching.

U.S. Pat. No. 3,994,823 (Ainger et al.) discloses lead zirconate ceramic, which may also contain Bi. U may be added to reduce electrical resistivity. The ceramic of Ainger et al. is not aimed at nuclear waste storage.

SUMMARY OF THE INVENTION

An object of the invention is to provide an improved glass composition and a method of making same for the primary containment of high-level radioactive nuclear waste. Another object of the invention is to provide a wasteform less subject to corrosion or ionic release than the prior art waste forms. A further object of the invention is to provide a stable wasteform which can be processed (i.e., that will dissolve the waste constituents) at a temperature lower than borosilicate glasses. A still further object of the invention is to provide a stable wasteform that exhibits a lower viscosity than borosilicate glass in the temperature range between 825° and 1050° C. A yet further object of the invention is to provide a stable wasteform for high-level radioactive nuclear wastes which is adaptable for use with existing glass fabrication technology. Other objects and advantages of the invention are set out herein or are obvious herefrom to one ordinarily skilled in the art.

The objects and advantages of the invention are achieved by the composition and process of the invention.

To achieve the foregoing and other objects and in accordance with the purpose of the invention, as embodied and broadly described herein, the invention involves a glass composition for the immobilization and disposal of high-level radioactive nuclear waste. Lead-iron phosphate glasses with several different compositions can be used as hosts for high level radioactive wastes. The lead-iron phosphate glass frit that is combined with the nuclear waste and melted to form radioactive waste monoliths can be prepared using either of two simple processes. In one process, the appropriate amounts of PbO and $Fe_2O_3$ are combined with $(NH_4)H_2PO_4$ and the glass is formed by heating the mixture to about 850° C. A second procedure for forming the lead-iron phosphate glass frit involves simply mixing PbO and $Fe_2O_3$ with the appropriate amount of $P_2O_5$. The formation of the lead-iron phosphate glass frit can be accomplished in standard chemical processing facilities, since radioactive material is not involved at this stage of the production of a nuclear glass waste form. The most economical process would be used, but for the purposes of discussing the formation of the frit and its characteristics, the discussion is temporarily limited to the second process involving only the simple oxides. In this case, the practical concentration limits for the three oxide constituents of the host glass (i.e., PbO, $Fe_2O_3$, and $P_2O_5$) are listed in Table I.

Pure lead phosphate glass (i.e., a glass that does not contain either iron or nuclear waste) can be prepared by fusing PbO (lead oxide) with $P_2O_5$ (phosphorous pentoxide) between 800° and 900° C. The composition of the resulting glass frit can be continuously varied by adjusting the ratio of lead oxide to phosphorus oxide. If the weight percentage of lead oxide exceeds about 66 percent, however, a crystalline form of lead phosphate and not a glass is formed. Hence, the composition (66 wt. percent of PbO) represents a critical limit in the sense that compositions which contain larger amounts of lead oxide which can be melted together with $P_2O_5$ to form a suitable host glass for nuclear waste is not as well as defined. The composition consisting of about 45 wt. percent of PbO and 55 wt. percent of $P_2O_5$ was taken to represent the practical lower limit for the amount of lead oxide, since the viscosity of the molten glass increased rapidly as the PbO content was reduced below 45 wt. percent. The higher the melt viscosity, the harder the glass is to pour and the higher the processing temperature becomes. High processing temperatures for nuclear waste and undesirable since volatile radioactive species may be lost through vaporization, and the operation and maintenance of high temperature equipment in a remote processing facility are not economical. The amount of iron oxide which must be added to form the lead-iron phosphate waste glass depends on the iron concentration already present in the nuclear waste. High-level defense waste typically contains about 50 wt. percent of $Fe_2O_3$ (see Table II, first simulated nuclear waste composition), and, for this type of nuclear waste, no additional iron is added to the pure lead phosphate frit for the formation of a very stable nuclear waste glass. For most high-level commercial waste of the type generated by light water nuclear power reactors (see Table II, second simulated nuclear waste composition), however, additional iron oxide must be added to the pure lead phosphate glass in order to form a sufficiently stable, corrosion resistant nuclear waste glass.

The effects of iron oxide on the properties of pure lead phosphate glasses are critical. The addition of iron oxide to these glasses improves the corrosion resistance by a factor of more than 10,000 (see FIG. 3) and results in the formation of glasses that do not exhibit any evidence of devitrification after being heated in air at 575° C. for 100 h.

Perhaps most significantly, extremely stable lead-iron phosphate glasses can be prepared and poured easily at temperatures between 800° and 900° C. The results illustrated in FIG. 3 can be used in tailoring the composition of the lead-iron phosphate glass frit depending upon the iron concentration of a given type of nuclear waste. The highly stable waste form is realized when the iron concentration is adjusted to correspond to a content of about 9.0 wt. weight of $Fe_2O_3$ relative to the total weight of the glass composition.

Preferably the final nuclear waste glass composition contains about 9 weight percent of $Fe_2O_3$. Also preferably the $Fe_2O_3$ can be added to the glass composition in the form of one of the metal oxides present in the radioactive nuclear waste material. The $Fe_2O_3$ can also be added to the glass composition as a separate component.

Preferably the radioactive nuclear waste material is present in an amount of about 15 weight percent, based on the total weight of the glass composition, in the glass composition.

The invention can also generally be described as a stable primary containment medium for disposal of high-level radioactive nuclear wastes comprising lead-iron phosphate glass having a composition in the ranges indicated in Table I plus preferably about 15 weight percent of a mixture of metal oxide nuclear waste material. Such nuclear waste material can be, for example, of the type in interim storage at nuclear facilities or a combination of such interim storage type and the type of high level waste generated by commercial power reactors.

The advantages of lead-iron phosphate nuclear waste glasses as compared to borosilicate nuclear waste glass are:

1. Corrosion resistance at elevated temperature between 90° and 135° C. is at least 100 to 1000 times better;
2. Lower processing temperature for the wasteform (260° to 110° C. lower);

3. Lower melt viscosity in the 800° to 1050° C. temperature range;

4. Waste loading per unit volume which is at least as good as the practical waste loadings per unit volume achievable by using borosilicate glasses;

5. The ability to use a relatively inexpensive aluminum, aluminum alloy or stainless steel cannister for the glass casting step in processing; and 6. The lead-iron phosphate nuclear waste glass can be prepared using basically the same technology that has been developed to produce large monoliths of borosilicate nuclear waste glass.

The lead-iron phosphate glass wasteform of the invention provides an excellent containment medium for wastes such as those in interim storage at government nuclear facilities and high-level wastes generated by commercial nuclear power reactors.

The invention also includes a process for preparing the glass composition of the invention. The process includes admixing about 34 to about 55 weight percent, based on the total weight of the glass composition, of phosphorus oxide, about 45 to about 66 weight percent, based on the total weight of the glass composition, of lead oxide, and about 0 to about 9 weight percent of $Fe_2O_3$, based on the total of the glass composition and the amount of iron content in the nuclear waste to be processed. The admixture, to which about 15 weight percent of nuclear waste oxides have been added, is then melted to provide a liquid melt of a lead-iron phosphate glass. Usually the melt is heated to and kept at 800° to 1050° C. About 10 to about 20 weight percent, based on the total weight of the glass composition, of radioactive nuclear waste material containing at least one metal oxide is added to the liquid melt of lead phosphate glass. Preferably the radioactive nuclear waste material contains sufficient $Fe_2O_3$ to provide preferably about 9 weight percent, baesd on the total weight of the glass composition, of $Fe_2O_3$ in the glass composition. The liquid melt is then solidified to provide the glass composition for the immobilization and disposal of the radioactive nuclear waste material.

Preferably the phosphorus oxide is used in the form of ammonium orthophosphate monohydrogen, i.e., $(NH_4)_2HPO_4$. The addition steps for the nuclear waste and the $Fe_2O_3$ can be be conducted simultaneously or in any desired sequence.

In an alternative to the preferred embodiment of the invention, all or part of the $Fe_2O_3$ used in the glass composition can be added as a separate component. In such case the $Fe_2O_3$ can be added directly to a liquid melt of lead phosphate glass and/or added to the radioactive nuclear waste material before such is added to the liquid melt of the lead phosphate glass.

The lead-iron phosphate nuclear waste glass of the invention is a very stable, easily prepared storage medium for some important classes of nuclear waste. Relative to borosilicate nuclear waste glass, the lead-iron phosphate nuclear waste glass has several distinct advantages. These advantages of the invention glass compositions include: (1) a corrosion resistance at 90° C. that is about 1000 times higher than a comparable borosilicate glass in the pH range between 5 and 9, which is mostly due to the presence of iron in the phosphate glass composition, (2) a processing temperature that is 100° to 250° C. lower than that currently required to process borosilicate glass, and (3) a lower melt viscosity in the 800° to 1050° C. range. The presence of iron is primarily responsible for the very high corrosion resistance of the lead-iron phosphate nuclear waste glass of the invention relative to that of the pure lead phosphate glass. The lead-iron phosphate glass of the invention is an excellent storage medium for high-level radioactive nuclear waste.

Reference will now be made in detail to the present preferred embodiment of the invention, some of the advantages of which are illustrated in the accompanying drawings.

BRIEF DESCRIPTION OF THE DRAWINGS

The accompanying drawings, which are incorporated in and form a part of the specification, illustrate some of the advantages of the invention and, together with the description, serve to explain the principles of the invention.

In the drawings.

DETAILED DESCRIPTION OF THE INVENTION

All parts, percentages, ratios and proportions are on a weight basis unless otherwise stated herein or obvious herefrom to one ordinarily skilled in the art.

Pure lead phosphate glass (i.e., a glass that does not contain any nuclear waste or iron) can be prepared by melting together PbO (lead oxide) and $P_2O_5$ (phosphorus oxide) at elevated temperatures. The composition of the resulting glass can be varied by varying the ratio of the weight of PbO to the weight of $P_2O_5$. However, if the weight percent of lead oxide exceeds about 66 weight percent a crystalline form of lead phosphate, not a glass, is formed. Hence, this composition (66 weight percent of PbO, and 34 weight percent of $P_2O_5$) represents a critical limit in the sense that compositions which contain larger amounts of lead oxide no longer form a glass.

The lower limit on the minimum amount of PbO which can be melted together with $P_2O_5$ to form a suitable host glass for nuclear waste is important, although not as clear cut. The composition consisting of about 45 weight percent PbO and 55 weight percent of $P_2O_5$ was taken to be a practical lower limit on the amount of lead oxide needed, since the viscosity of the molten glass became much larger as the PbO content was reduced further. The higher the viscosity, the harder the glass is to pour and the higher the required processing temperature becomes.

The addition of simulated nuclear waste to the pure lead phosphate host glass does not substantially modify the lead oxide and phosphorous oxide limits discussed above. It was found, however, that the addition of simulated radioactive nuclear waste containing $Fe_2O_3$ to the lead phosphate host glass produced a dramatic decrease in the corrosion rate. That is, pure lead phosphate glasses (i.e., with no $Fe_2O_3$ containing nuclear waste added) are quite susceptible to aqueous corrosion. When the simulated radioactive nuclear waste containing $Fe_2O_3$ was added to the lead phosphate host glass, however, a highly corrosion resistant and stable nuclear waste glass was formed.

The lead phosphate glass appears to be insensitive to the details of the preparation procedure and can be made with a very large variation in the molar ratio of PbO to $P_2O_5$ as indicated. For example, specimens of homogeneous lead-iron phosphate nuclear waste glasses loaded with 15 weight percent of simulated radioactive nuclear waste material have been prepared with the amount of PbO in the lead-iron phosphate host glass varied from 45 to 66 weight percent, the amount of $P_2O_5$ varied from 34 to 55 weight percent, and the amount of $Fe_2O_3$ varied from 0 to 10 weight percent depending on the iron content of the simulated nuclear waste.

Figure 3:
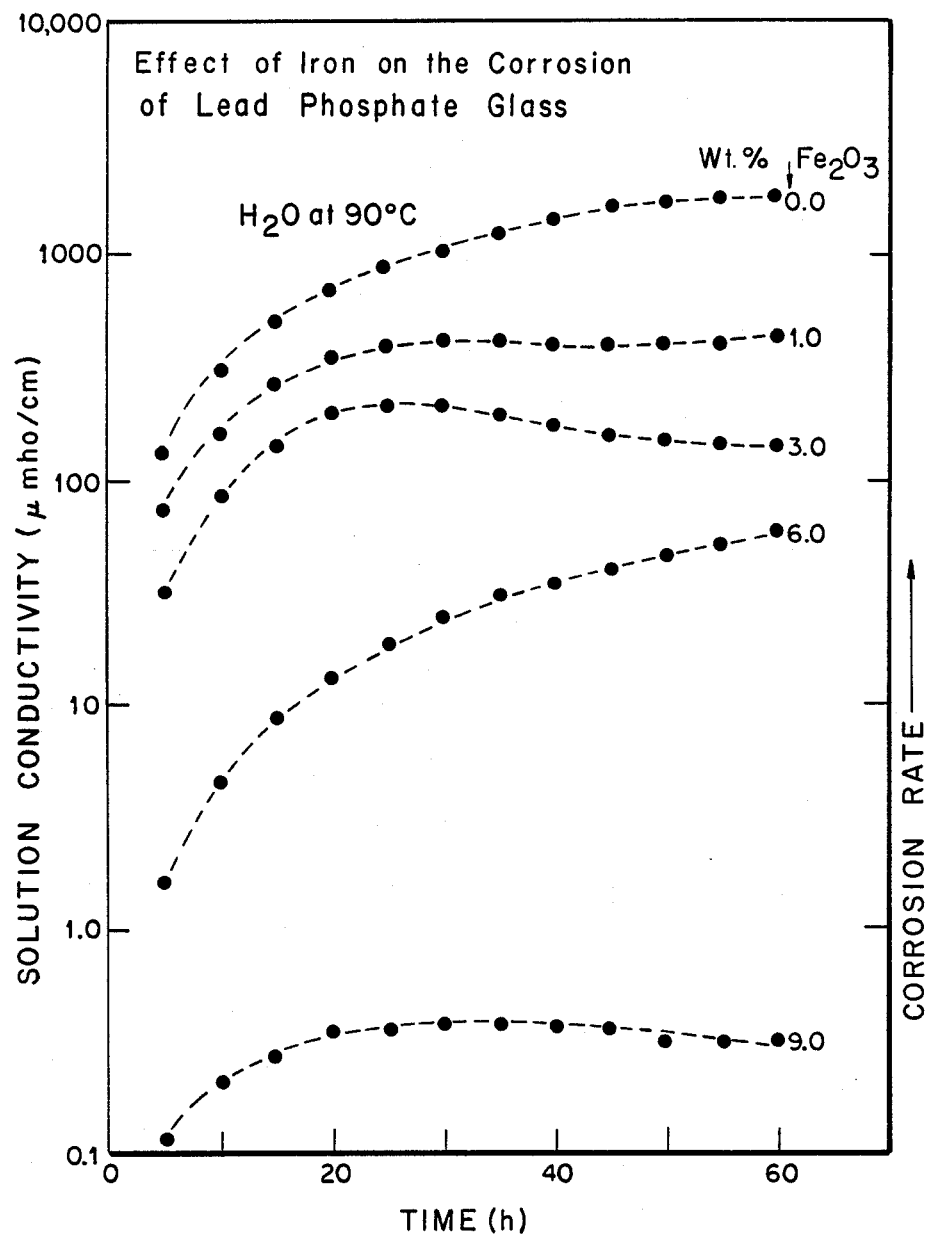
FIG. 3 is a plot of the effect of the iron content at 90° C. on the corrosion of lead phosphate glass.

Most of the decrease in the corrosion rate of the lead-iron phosphate nuclear waste glass is due to the large amounts of iron oxide present in the radioactive nuclear waste material (for example, at one nuclear facility about 50 weight percent of the radioactive nuclear waste material is iron oxide $Fe_2O_3$). The effects of various amounts of iron oxide on the corrosion rate of lead phosphate are shown in FIG. 3. As can be easily seen from FIG. 3, the addition of 9 weight percent $Fe_2O_3$ to a pure lead phosphate glass improves the corrosion resistance by a factor of about 10,000. Hence, by purposely adding about 9 weight percent iron oxide to pure lead phosphate glass, one can produce a very stable and easily prepared glass, which can then be used to immobilize other types of radioactive nuclear waste material which do not contain large amounts of iron oxide. These wastes include reprocessed commercial nuclear power reactor wastes. FIG. 3 shows that the corrosion rate is substantially reduced by including at least about 9 weight percent of iron oxide ($Fe_2O_3$) in the lead phosphate glass composition. This application has been successfully demonstrated in experiments where both simulated high-level defense nuclear waste and simulated radioactive nuclear-power reactor wastes were added to the lead-iron phosphate host glass. The resulting nuclear waste glass was a highly corrosion resistant and stable wasteform.

The combining of radioactive nuclear waste with lead-iron phosphate glass forms a nuclear waste glass that is highly corrosion resistant, not susceptible to devitrification, and that can be prepared at a relatively low temperature. The presence of a high level of $Fe_2O_3$ is critical. This type of synergistic effect, in which the corrosion resistance of the combined material is enhanced, also occurs in the case of borosilicate glass waste forms in that the waste loaded glass is significantly more stable than a glass formed from the pure borosilicate glass frit. In fact, the pure borosilicate host glass typically corrodes about 10 times faster than the glass in combination with simulated nuclear waste. [See: Sales, B.C., L.A. Boatner, H. Naramoto and C.W. White, J. Non-Cryst. Solids 53 (1982) 201; and Clark, D.E., C.A. Mauer, A. R. Jurgenson and L. Urwongse in Scientific bases for Nuclear Waste Management, Vol. 11, ed. W. Lutze (Elsevier North Holland, New York, 1982) pp. 1 to 14.] For the lead-iron phosphate waste form, however, the improvement in corrosion resistance following addition of the simulated iron-containing waste is much greater.

Lead-iron phosphate glass is quite suitable as a long-term storage medium for high-level nuclear waste. The properties of lead-iron phosphate nuclear waste glass are superior to a borosilicate nuclear waste glass, which was recently selected for the long-term storage of some high level nuclear defense wastes. The borosilicate nuclear waste glass therefore is used herein as a standard to which new wasteform of the invention is compared.

The invention provides a stable primary containment medium for disposal of high-level radioactive nuclear waste. The invention wasteform typically comprises a lead-iron phosphate glass containing up to 20 weight percent of nuclear waste of the type typically consisting of 50 weight percent of $Fe_2O_3$, 9.8 weight percent of $Al_2O_3$, 13.8 weight percent of $MnO_2$, 4.5 weight percent of $U_3O_8$, 3.7 weight percent of CaO, 6.2 weight percent of NiO, 1.2 weight percent of $SiO_2$, 7.1 weight percent of $Na_2O$, 1 weight percent of $Cs_2O$, 1 weight percent of SrO and 1.3 weight percent of $Na_2SO_4$ (or other nuclear waste mixtures with similar compositions). Such compositions with varying amounts of iron and aluminum represents a class of nuclear defense wastes. In addition, the lead-iron phosphate nuclear waste glass can typically be prepared containing 10 weight percent, of the above composition plus 5 weight percent of a composition that is representative of the waste generated by nuclear power reactors. In distilled water at 90° C., the net release of all elements from both types of lead-iron phosphate nuclear waste glasses are 100 to 1000 times smaller (depending on the specific element) than the corresponding amounts released by a comparably loaded borosilicate glass wasteform.

EXAMPLE

Several lead-iron phosphate glasses were prepared incorporating either simulated radioactive defense nuclear waste or simulated reprocessed commercial waste combined with simulated radioactive defense waste to demonstrate the invention. Appropriate amounts of PbO and $(NH_4)_2HPO_4$ powders were thoroughly mixed with 15 weight percent of a powdered form of a simulated metal oxide nuclear waste and melted in a platinum crucible at temperatures between 800° and 1050° C. for 3 hours. See Table II for the compositions. The compositions of the lead-iron phosphate host glass studied are given in Table I. The molten glass was then poured into a heated mold of spectroscopically pure carbon, annealed at 450° C. for 2 hours and cooled to room temperature over the space of a few hours. All of the components of the waste were readily dissolved in a short time at 1050° C., and all of the components except $Al_2O_3$ and $ZrO_2$ were dissolved at temperatures between 800° and 900° C. The lead-iron phosphate glass wasteforms prepared at 800° to 900° C. in which $Al_2O_3$ and $ZrO_2$ were not completely dissolved, however, were as corrosion resistant as the lead-iron phosphate wasteforms prepared at 1050° C. All of the lead-iron phosphate glasses loaded with the simulated nuclear waste had a black appearance that resembled that of waste-loaded borosilicate glass. The lead-iron phosphate glasses that were heated to between 1000° and 1050° C. were very homogeneous.

Figure 1:
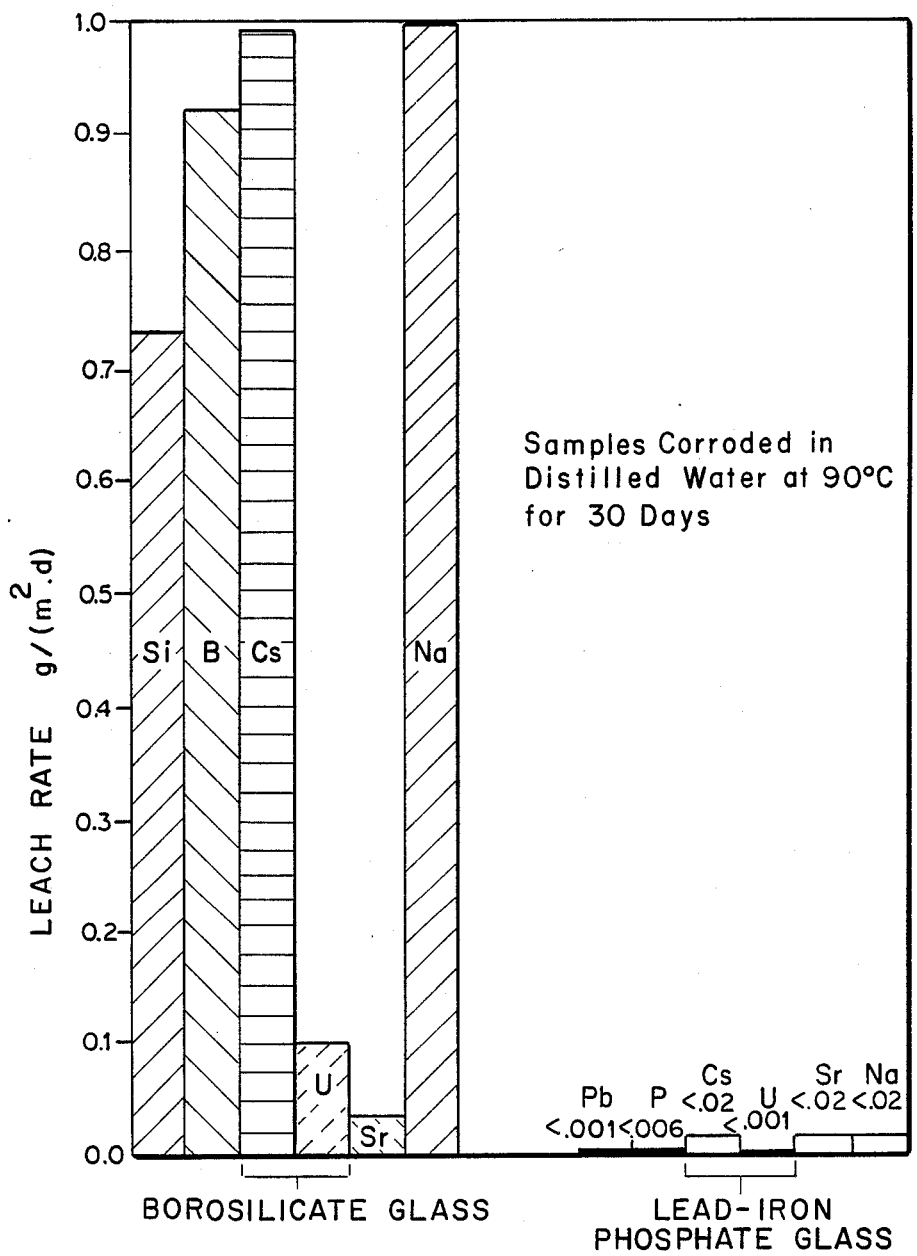
FIG. 1 is a bar graph comparing the corrosion characteristics of a simulated-waste-loaded conventional borosilicate glass with those of the invention.

Corrosion tests of the type (MCC-1) developed by the Materials Characteristics Center located at Battelle Northwest Laboratories were used to compare the corrosion behavior of the lead-iron phosphate nuclear wasteform with that of an identically loaded borosilicate glass nuclear wasteform. Each wasteform was corroded for one month in distilled water at 90° C. The results are shown in FIG. 1. The data shows that the net release of all of the elements from the lead-iron phosphate wasteform was at least 100 to 1000 times smaller than the corresponding amounts released by the borosilicate wasteform (that is, Frit 131 plus 29 percent of the first simulated nuclear waste composition—see Table II for the exact compositions). The concentrations of all of the elements present in the lead-iron phosphate leachate were below the detectable limits of the standard analytical chemical techniques employed (in this case, inductively coupled plasma emission analysis—ICP, atomic absorpotion, and flourimetry). The presence of iron (a component of the nuclear waste material) is primarily responsible for the very high corrosion resistance of the nuclear waste glass relative to that of pure lead phosphate glass.

TABLE I

Lead-iron phosphate host glass compositions. The nuclear waste glass is formed by melting the lead-iron phosphate host glass together with a powdered form of the nuclear waste.

| Compound | Weight % |
|---|---|
| PbO | 40–66 |
| $P_2O_5$ | 30–55 |
| $Fe_2O_3$*[1] | 0–10 |

Note:
[1]Amount of iron oxide added depends on type of high-level nuclear waste.

TABLE II

Lead-Iron Phospate And Borosilicate Nuclear Waste Glass Compositions

| Typical Lead-Iron Phosphate Compositions (weight percent) | | Frit 131 Composition (Borosilicate Glass) (weight percent) | | First Simulated Nuclear Waste Composition (weight percent) | | Second Simulated Nuclear Waste Composition (weight percent) | |
|---|---|---|---|---|---|---|---|
| PbO | 40–66 | | | | | | |
| $P_2O_5$ | 30–55 | | | | | | |
| $Fe_2O_3$ | 0–10 | | | | | | |
| | | $SiO_2$ | 57.9 | $Fe_2O_3$ | 50.0 | $ZrO_2$ | 12.10 |
| | | $B_2O_3$ | 14.7 | $Al_2O_3$ | 9.8 | $MoO_3$ | 12.67 |
| | | $Na_2O$ | 17.7 | $MnO_2$ | 13.8 | $Nd_2O_3$ | 11.6 |
| | | $Li_2O$ | 5.7 | $U_3O$ | 4.5 | $CeO_2$ | 8.13 |
| | | MgO | 2.0 | $CaO^8$ | 3.7 | $RuO_2$ | 10.27 |
| | | $TiO_6$ | 1.0 | NiO | 6.3 | $Cs_2O$ | 7.05 |
| | | $ZrO_2$ | 0.5 | $SiO_2$ | 1.3 | $U_5O_8$ | 5.54 |
| | | $La_2O_3$ | 0.5 | $Na_2O$ | 7.2 | $La_2O_3$ | 3.6 |
| | | | | $Na_2SO_4$ | 1.3 | $Pr_2O_3$ | 3.6 |
| | | | | $Cs^2O$ | 1.0 | $Sm_2O_3$ | 2.2 |
| | | | | $SrO^2$ | 1.0 | $Fe_2O_3$ | 3.7 |
| | | | | | | $P_2O$ | 1.64 |
| | | | | | | $SrO^3$ | 2.59 |
| | | | | | | BaO | 3.83 |
| | | | | | | PdO | 3.65 |
| | | | | | | $TeO_2$ | 1.44 |
| | | | | | | $Y_2O_3$ | 1.46 |
| | | | | | | Other Oxides | 5.0 |

In more detail, FIG. 1 shows the 30-day corrosion rates at 90° C. in distilled $H_2O$ for lead-iron phosphate [$Pb(PO_3)_2$ plus 15 weight percent of the first simulated nuclear waste] and borosilicate (Frit 131 plus 29 weight percent of the first simulated nuclear waste) nuclear waste glasses. The lead-iron phosphate and borosilicate nuclear waste glasses had the same waste per volume loading.

Figure 2:
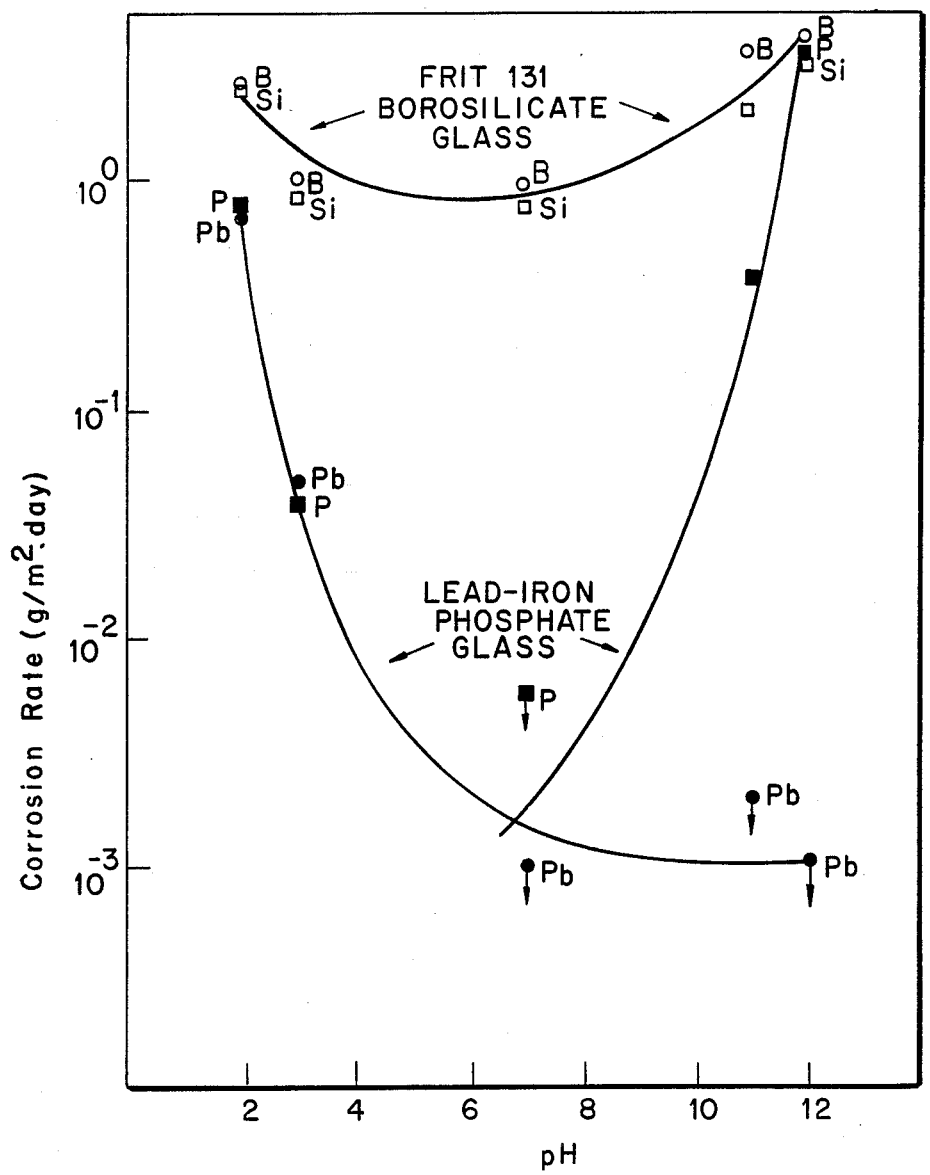
FIG. 2 is a plot of the corrosion rate at 90° C. of both the lead-iron phosphate wasteform and the borosilicate glass wasteform versus the pH of the corroding solution.

The effects of the pH of the corroding solution on the corrosion rate of the lead-iron phosphate wasteform was also investigated (see FIG. 2) and compared to the behavior of a borosilicate glass wasteform. The lead-iron phosphate wasteform was comprised of 50 weight percent of PbO and 50 weight percent of $P_2O_5$ plus 15 weight percent of the first simulated nuclear waste (see Table II). The waste weight percentages for the lead-iron phosphate glass versus borosilicate glass yield comparable waste per volume factors due to the higher density of the lead-iron phosphate glass (i.e., 5±0.1 g/cm$^3$) relative to borosilicate glass (2.6 g/cm$^3$). The borosilicate glass was comprised of Frit 131 plus 9 weight percent of the first simulated nuclear waste (see Table II). In the neutral pH regions (i.e., for pH values between 5 and 9) which encompass the pH range of most natural ground waters, the corrosion rate of the lead-iron phosphate wasteform was 100 to 1000 times smaller than the corresponding corrosion rates of the borosilicate glass wasteform. At the pH extremes of 2 to 12, the corrosion rate of the lead-iron phosphate wasteform approaches but does not exceed that of the borosilicate glass wasteform (see FIG. 2).

Other tests indicated that the corrosion behavior of the lead-iron phosphate wasteform was not affected by large doses of gamma radiation, nor was the material unusually susceptible to corrosion at a higher temperature, e.g., 135° C.

In the 800° to 1050° C. temperature range, the viscosity of the molten lead-iron phosphate wasteform is much less than the prototype borosilicate glass wasteform, as evidenced by the fact that the lead-iron phosphate could be easily poured at 800° C. In spite of the low viscosity for the lead-iron phosphate between 800° to 1000° C., the phosphate glass wasteform softened at 600° C. which was about 25° C. higher than the softening point of the borosilicate glass wasteform.

A lead-iron phosphate wasteform was exposed to air at 550° C. for 60 hours in order to determine if there was any rapid tendency to devitrify. No obvious devitrification of the wasteform was detected using X-ray diffraction analysis, and a subsequent corrosion test on the sample showed no degradation in corrosion resistance. A similar test of borosilicate glass treated at 500° C. for 60 hours indicated that the borosilicate glass corrosion rate was measurably higher following the heat treatment.

Since higher temperatures are needed to completely dissolve the $Al_2O_3$ present in some radioactive nuclear wastes, an aluminum base alloy can be employed as a cannister material. A lead-iron phosphate glass wasteform of the invention was melted at 800° C. in accordance with this invention and poured into a pure aluminum container (aluminum melts at 660° C.). The aluminum container did not melt.

The foregoing prescription of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A nuclear containment composition resulting from the solidification of a melt of (1) a lead phosphate glass consisting essentially of, in weight percent, 45–66% PbO, 34–55% $P_2O_5$, (2) a radioactive metal oxide mixture incorporated in said glass, and (3) an effective corrosion-inhibiting concentration up to 9% $Fe_2O_3$ incorporated in said glass, based on the total weight of said composition.

2. The composition of claim 1 in which the metal oxide mixture content by weight is up to 20% of the lead-phosphate glass.

3. An improved process for the containment of radioactivity comprising:
    (a) forming a melt, at a temperature in the range of 800° C. to 1,500° C., of a lead glass composition consisting essentially of 45–66% PbO, 34–55% $P_2O_5$ or a compound readily decomposable to $P_2O_5$ and an effective corrosion - inhibiting concentration of up to 9% $Fe_2O_3$; and
    (b) incorporating up to 20%, based on the weight of the glass composition of a radioactive metal oxide mixture and then solidifying the melt.

* * * * *